United States Patent
Daniels et al.

(10) Patent No.: US 6,245,846 B1
(45) Date of Patent: *Jun. 12, 2001

(54) HALOGENATED POLYMERIC FORMULATION CONTAINING DIVALENT (HYDROXY) STANNATE AND ANTIMONY COMPOUNDS AS SYNERGISTIC FLAME-RETARDANTS

(75) Inventors: Clare Daniels, Hayes; Mandy Jayne Herbert, Slough; Michael Rai, Hounslow, all of (GB)

(73) Assignee: Alcan International Limited, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,233

(22) PCT Filed: Jan. 7, 1998

(86) PCT No.: PCT/GB98/00032

§ 371 Date: Sep. 2, 1999

§ 102(e) Date: Sep. 2, 1999

(87) PCT Pub. No.: WO98/30636

PCT Pub. Date: Jul. 16, 1998

(30) Foreign Application Priority Data

Jan. 8, 1997 (EP) .................................................. 97300075

(51) Int. Cl.[7] ............................ C08K 3/22; C08L 27/06; C08L 33/26

(52) U.S. Cl. .................... 524/409; 524/413; 524/436; 524/437; 524/567; 524/555; 524/569

(58) Field of Search ..................................... 524/411, 409, 524/436, 437, 567, 569, 555, 413

(56) References Cited

U.S. PATENT DOCUMENTS

| | | |
|---|---|---|
| 5,358,991 | 10/1994 | O'Brien . |
| 5,681,879 | * 10/1997 | Yamamoto et al. ................. 524/373 |
| 5,736,605 | * 4/1998 | Oshima ................................ 524/521 |

FOREIGN PATENT DOCUMENTS 8193136   7/1996   (JP) .

OTHER PUBLICATIONS

World Patent Index, Accession No. 96–397275, XP 002060012, Abstract corresponding to Japanese Patent No. 8193136, published Jul. 30, 1996.

* cited by examiner

Primary Examiner—David W. Wu
Assistant Examiner—Kelechi Egwim
(74) Attorney, Agent, or Firm—Cooper & Dunham LLP

(57) ABSTRACT

In PVC polymer formulations for sheathing for electric wires and cables, it has been determined that antimony trioxide and divalent metal (e.g. zinc) stannate or hydroxystannate cat provide a synergistic flame-retardant additive combination. In this invention, polymer formulations using this flame-retardant additive combination contain not more than 1.5 wt. % of antimony trioxide.

7 Claims, 2 Drawing Sheets

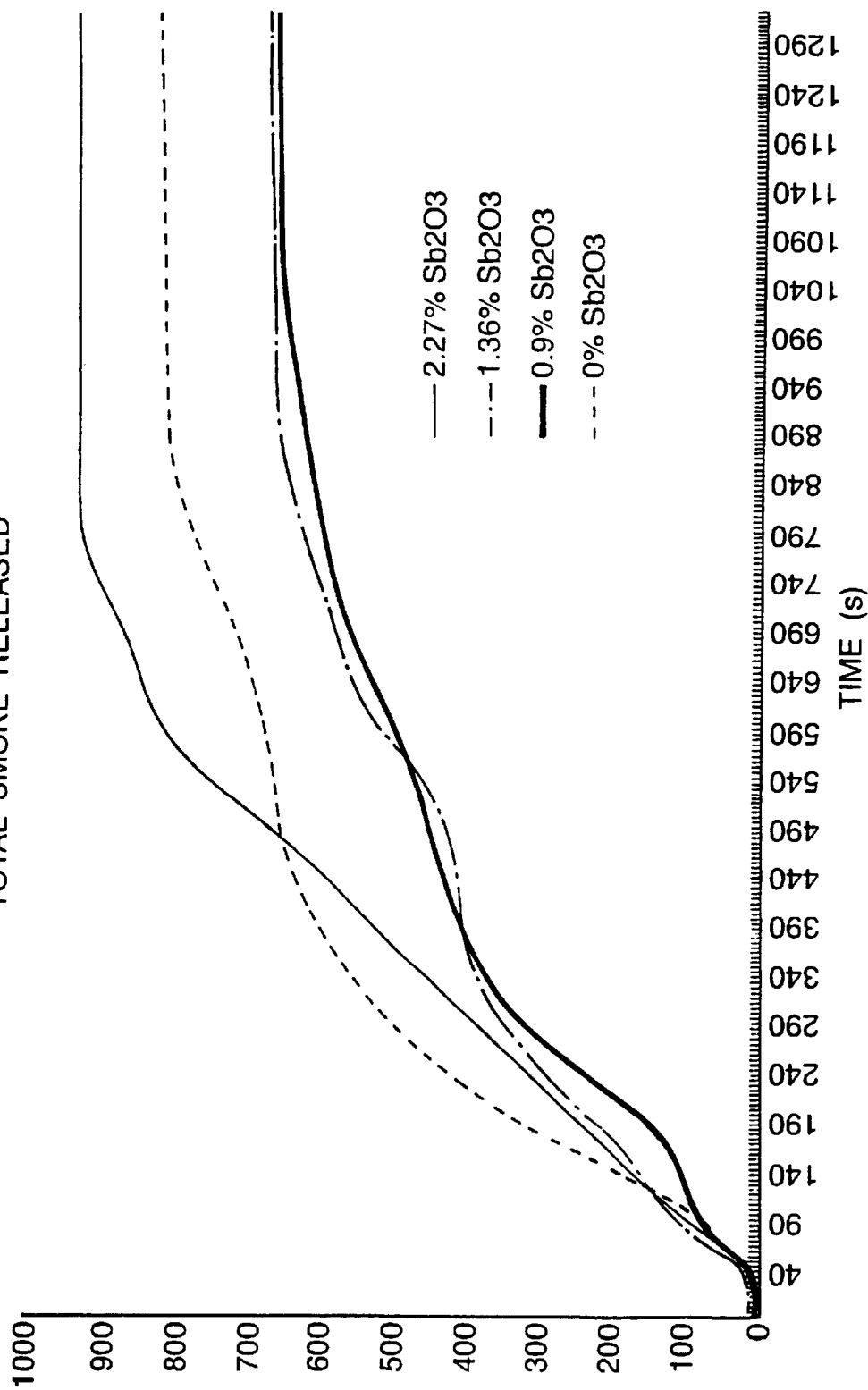

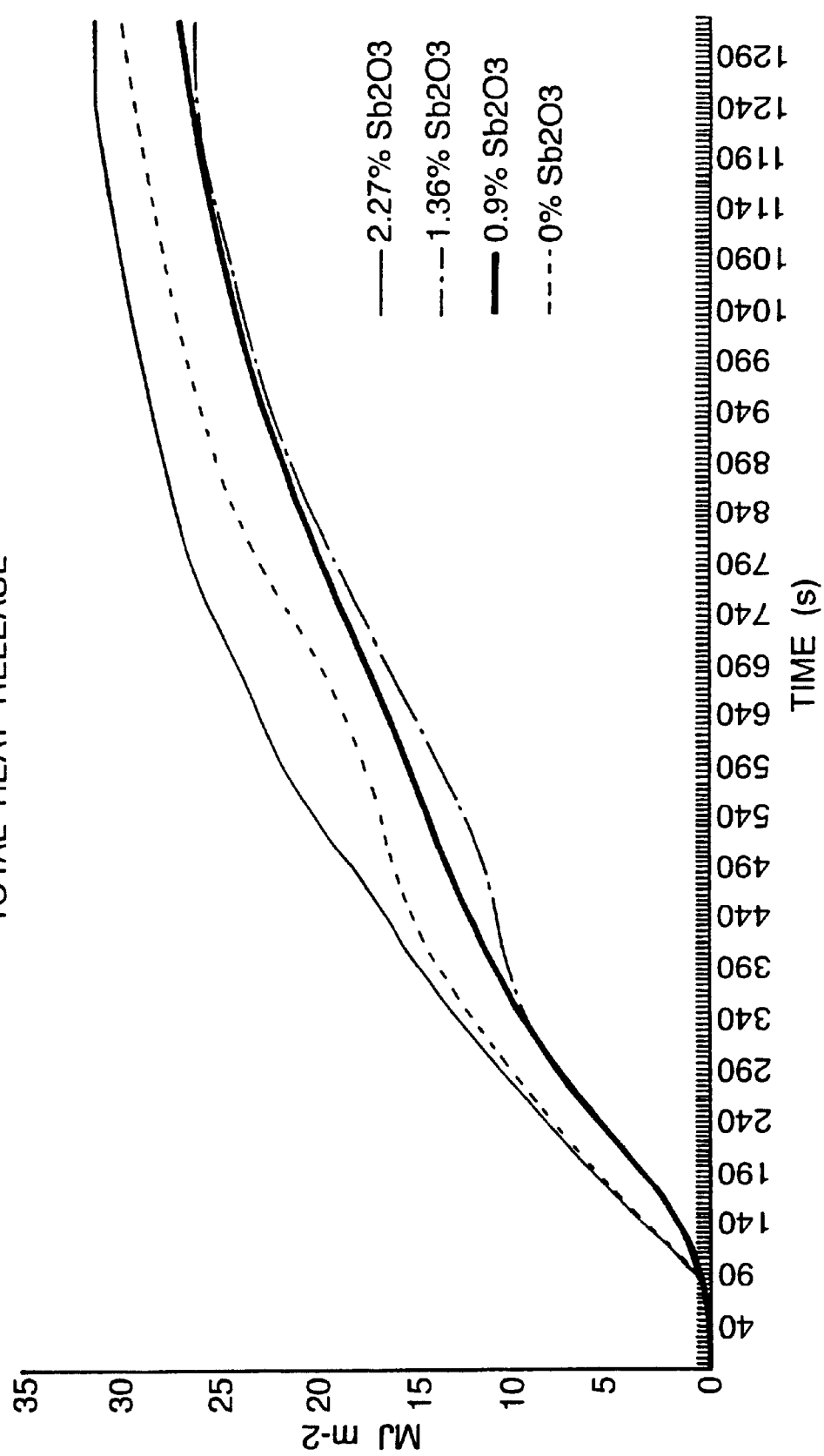
Fig.2. TOTAL HEAT RELEASE

HALOGENATED POLYMERIC FORMULATION CONTAINING DIVALENT (HYDROXY) STANNATE AND ANTIMONY COMPOUNDS AS SYNERGISTIC FLAME-RETARDANTS

This invention relates to polymer formulations containing fire-resistant additives.

In a paper entitled "PVC Cable Sheathing with Improved Smoke Characteristics" presented at FR'96 London and published by Interscience (ISBN 095163286), Mandy J Herbert has described a PVC formulation containing 30 phr (parts by weight per hundred parts by weight of resin) of a phosphate plasticiser; 20 phr of a brominated aromatic ester; 30 phr of aluminum trihydroxide; 7 phr of a stabiliser; 1 phr of process aid; and 10 phr of a flame retardant additive consisting of equal proportions by weight of antimony trioxide and zinc stannate with or without ammonium octamolybdate. This was a heavily loaded formulation designed specifically for use as sheathing for optic fibers and electric wires and cables. Particularly in the presence of ammonium octamolybdate, the antimony trioxide and zinc stannate were shown to act synergistically.

Many different polymer formulations contain halogen, in the polymer itself as in the case of PVC and/or in a halogenated plasticiser or other additive. In these formulations it is well known that antimony compounds have valuable flame retardant properties. However there is a reluctance to use antimony compounds in polymer formulations for general use, because of the supposed toxicity either of the antimony or of possible impurities such as arsenic. Antimony compounds often have a deleterious effect on the smoke performance of polymer systems. There is a need for smoke suppressant additives, for use in a wide range of polymer formulations containing halogen, which contain only low levels of antimony compounds. This invention seeks to make use of the synergistic effect disclosed in a restricted context in the above-mentioned paper, to meet that need.

The invention provides a formulation comprising at least one polymer and at least one additive, halogen being present in the polymer and/or the additive, wherein there is present from 2 to 10 parts by weight, per hundred parts by weight of the polymer, of a mixture of 90–10 wt % of an antimony compound and 10–90 wt % of a divalent metal stannate or hydroxystannate, provided that the formulation contains not more than 1.5 wt % of the antimony compound.

The formulation may be solid or semi solid having plastic or to elastic properties, e.g. thermosetting or thermoplastic, before or after curing; or may be liquid as in a paint; or may be in comminuted form as in a powder paint; or may be a shaped or moulded product or cured coating film.

The polymer may be an organic polymer for example polyolefine, polystyrene, polyester, polyamide, acrylic, epoxy, phenolic, or preferably polyvinylchloride (PVC).

The formulation may contain known additives in known concentrations, for example pigments, plasticisers, flame-retardants, smoke-suppressants, fillers, stabilisers, process aids, antioxidants, etc. If the polymer itself does not contain halogen (generally chlorine or bromine) then at least one additive contains halogen. This may be for example a chlorinated or brominated plasticiser.

Among these additives may be mentioned flame-retardants and smoke-suppressants including phosphate plasticisers, chlorinated and brominated aromatic esters, aluminum trihydroxide, hydroxides and carbonates and intermediate compounds (basic carbonates or hydroxycarbonates) of divalent metals such as magnesium and calcium, and molybdenum compounds such as ammonium octamolybdate. Preferably the formulation contains at least 20 phr e.g. 30–120 phr of aluminum trihydroxide. Preferably the formulation contains at least 5 phr, e.g. 10–40 phr of a halogenated plasticiser.

As noted, the formulation contains 2–10 phr of a mixture of an antimony compound and a divalent metal stannate or hydroxy stannate.

Preferably the antimony compound is antimony trioxide or antimony pentoxide, present in an amount of not more than 1.5 wt %, and preferably less than 1.0 wt % of the whole formulation. Preferably the divalent metal stannate or hydroxy stannate is calcium, strontium, barium, magnesium, or particularly zinc stannate or hydroxy stannate. The divalent metal stannate or hydroxy stannate may optionally contain halide (e.g. chloride or bromide) and/or amine (e.g. ammonia or alkylamine) values.

A preferred formulation consists essentially of PVC with 20–100 phr of at least one plasticiser including at least 10 phr of a chlorinated plasticiser, from 30–120 phr of aluminum trihydroxide, a stabiliser present in a functional concentration, and 2–10 phr of a mixture of 90–10 wt % of antimony trioxide and 10–90 wt % of zinc stannate or hydroxy stannate.

These formulations have use in very many areas, wherever polymer formulations need to have flame-retardant and particularly smoke suppressant properties. Preferred formulations based on PVC are suitable for use in electrical installations equipment and sheathing.

BRIEF DESCRIPTION OF DRAWINGS

FIG. 1 is a graph of total smoke released against time for various formulations, and FIG. 2 is a graph of total heat release against time for the same formulations.

EXAMPLE 1

The formulation used for this work is tabulated below:

| Formulation | | phr* |
|---|---|---|
| PVC S706 | PVC | 100 |
| DOP | Plasticiser | 30 |
| Cereclor S52 | Chlorinated plasticiser | 20 |
| SF4E | Aluminium Trihydroxide | 60 |
| CD33 | Stabiliser | 5 |
| | Flame retardant | 5 |

*weight in parts per hundred of PVC

The combination of flame retardants tested were:

| Flame Retardant fillers | phr | % $Sb_2O_3$ | % Flamtard H |
|---|---|---|---|
| $Sb_2O_3$/Flamtard H | 5/0 | 2.27 | 0 |
| $Sb_2O_3$/Flamtard H | 3/2 | 1.36 | 0.91 |
| $Sb_2O_3$/Flamtard H | 2/3 | 0.91 | 1.36 |
| $Sb_2O_3$/Flamtard H | 0/5 | 0 | 2.27 |

Flamtard H is a Trade Mark of Alcan for Zinc Hydroxystannate

Cone calorimeter methods allow the determination of a number of parameters. Of key importance are heat and smoke release.

From FIGS. 1 and 2 and corresponding formulation details it can be seen that compounds containing $Sb_2O_3$ and Flamtard H as sole additives produce significantly more smoke and heat than those where Flamtard and $Sb_2O_3$ are used in combination.

EXAMPLE 2

In this example, the work was divided into four parts lettered A, B, C and D. In part A, the same formulation was used as in Example 1. The work is an extension of Example 1, and the tabulated results obtained from cone calorimetry and the Critical Oxygen Index (COI) measurements provide a striking demonstration of the strong synergistic effect that exists between antimony trioxide and zinc hydroxystannate.

In B, the formulation is as in A except that the aluminum trihydroxide has been replaced by a corresponding amount of a calcium carbonate filler.

In C, the formulation is as in A except that the chlorinated plasticiser has been replaced by ordinary dioctyl phthalate (DOP) plasticiser.

In D, the formulation is as in A except that the plasticiser is all DOP and the filler is all calcium carbonate.

Little or no synergistic effect is seen in B, C or D. Thus in this particular PVC formulation, it appears that the chlorinated plasticiser and the aluminium trihydroxide are both necessary in order to see a pronounced synergistic effect between antimony oxide and zinc stannate. It is this synergistic effect that enables one to reduce the antimony trioxide below the level, e.g. 1.5% or 1% by weight on the weight of the formulation, that might have been thought necessary to provide adequate flame-retardant. In other formulations involving other polymers it is likely/possible that this additive combination (aluminium trihydroxide plus chlorinated plasticiser) will not be necessary in order to observe the synergistic effect between antimony trioxide and zinc hydroxystannate.

Synergistic effects of Flamtard and $Sb_2O_3$.

| Formulation | | phr* |
|---|---|---|
| PVC S706 | PVC | 100 |
| DOP | Plasticiser | 30 |
| Cereclor | Chlorinated Plasticiser | 20 |
| SF4E | Aluminium Trihydroxide | 60 |
| CD33 | Stabilizer | 5 |
| | Flame retardant | 5 |

*weights in parts per hundred of PVC.

The combination of flame retardants tested in this formulation were:

| Flame retardant fillers | phr | % $Sb_2O_3$ | % Flamtard H |
|---|---|---|---|
| $Sb_2O_3$/Flamtard H | 5/0 | 2.27 | 0 |
| $Sb_2O_3$/Flamtard H | 3/2 | 1.36 | 0.91 |
| $Sb_2O_3$/Flamtard H | 2/3 | 0.91 | 1.36 |
| $Sb_2O_3$/Flamtard H | 0/5 | 0 | 2.27 |

Results obtained from cone calorimetry and the COI are tabulated below:

| | 2.27% $Sb_2O_3$ | 1.36% $Sb_2O_3$ | 0.90% $Sb_2O_3$ | 0.00% $Sb_2O_3$ |
|---|---|---|---|---|
| COI (% $O_2$) Cone | 41.3 | 44.8 | 44.4 | 41.5 |
| Time to ignition (s) | 67 | 147.5 | 144 | 87 |
| Peak rate of heat release (kW/m²) | 87 | 78 | 77 | 86 |
| Total heat released (MJ/m²) | 51.7 | 45.7 | 45.3 | 50.7 |
| Total smoke released (-)** | 1,583.35 | 1,101.35 | 1,101.55 | 1,362.15 |

**a dimensionless unit

Synergistic effects of Flamtard and $Sb_2O_3$.

| Formulation | | phr* |
|---|---|---|
| PVC S706 | PVC | 100 |
| DOP | Plasticiser | 30 |
| Cereclor | Chlorinated Plasticiser | 20 |
| Calcium Carbonate | Filler | 60 |
| CD 33 | Stabilizer | 5 |
| | Flame retardant | 5 |

*weights in parts per hundred of PVC

The combination of flame retardants tested in this formulation were:

| Flame retardant fillers | phr | % $Sb_2O_3$ | % Flamtard H |
|---|---|---|---|
| $Sb_2O_3$/Flamtard H | 5/0 | 2.27 | 0 |
| $Sb_2O_3$/Flamtard H | 3/2 | 1.36 | 0.91 |
| $Sb_2O_3$/Flamtard H | 2/3 | 0.91 | 1.36 |
| $Sb_2O_3$/Flamtard H | 0/5 | 0 | 2.27 |

Results obtained from cone calorimetry and the COI are tabulated below:

| | 2.27% $Sb_2O_3$ | 1.36% $Sb_2O_3$ | 0.90% $Sb_2O_3$ | 0.00% $Sb_2O_3$ |
|---|---|---|---|---|
| COI (% $O_2$) Cone | 37 | 37 | 36.5 | 35.3 |
| Time to ignition (s) | 79 | 79.5 | 67 | 54.5 |
| Peak rate of heat release (kW/m²) | 123 | 134.5 | 119 | 126 |
| Total heat released (MJ/m²) | 49.8 | 49.2 | 50.25 | 54.85 |
| Total smoke released (-) | 2,172.9 | 1,864.25 | 2,231.5 | 2,240.6 |

Synergistic effects of Flamtard and $Sb_2O_3$.

| Formulation | | phr* |
|---|---|---|
| PVC S706 | PVC | 100 |
| DOP | Plasticiser | 50 |

| Formulation | | phr* |
|---|---|---|
| SF4E | ATH | 60 |
| CD 33 | Stabilizer | 5 |
| | Flame retardant | 5 |

*weights in parts per hundred of PVC

The combination of flame retardants tested in this formulation were:

| Flame retardant fillers | phr | % $Sb_2O_3$ | % Flamtard H |
|---|---|---|---|
| $Sb_2O_3$/Flamtard H | 5/0 | 2.27 | 0 |
| $Sb_2O_3$/Flamtard H | 3/2 | 1.36 | 0.91 |
| $Sb_2O_3$/Flamtard H | 2/3 | 0.91 | 1.36 |
| $Sb_2O_3$/Flamtard H | 0/5 | 0 | 2.27 |

Results obtained from cone calorimetry and the COI are tabulated below:

| | 2.27% $Sb_2O_3$ | 1.36% $Sb_2O_3$ | 0.90% $Sb_2O_3$ | 0.00% $Sb_2O_3$ |
|---|---|---|---|---|
| COI (% $O_2$) Cone | 34.8 | 34.9 | 35.4 | 33.6 |
| Time to ignition (s) | 75.5 | 56 | 58.5 | 47 |
| Peak rate of heat release (kW/m$^2$) | 130 | 106 | 109.5 | 132 |
| Total heat released (MJ/m$^2$) | 64.05 | 57.8 | 58.9 | 58 |
| Total smoke released (-) | 2,219.25 | 2,013.3 | 1,948.15 | 1,998.9 |

Synergistic effects of Flamtard and $Sb_2O_3$.

| Formulation | | phr* |
|---|---|---|
| PVC S706 | PVC | 100 |
| DOP | Plasticiser | 50 |
| Calcium Carbonate | Filler | 60 |
| CD 33 | Stabilizer | 5 |
| | Flame retardant | 5 |

*weights in parts per hundred of PVC

The combination of flame retardants tested in this formulation were:

| Flame retardant fillers | phr | % $Sb_2O_3$ | % Flamtard H |
|---|---|---|---|
| $Sb_2O_3$/Flamtard H | 5/0 | 2.27 | 0 |
| $Sb_2O_3$/Flamtard H | 3/2 | 1.36 | 0.91 |
| $Sb_2O_3$/Flamtard H | 2/3 | 0.91 | 1.36 |
| $Sb_2O_3$/Flamtard H | 0/5 | 0 | 2.27 |

Results obtained from cone calorimetry and the COI are tabulated below:

| | 2.27% $Sb_2O_3$ | 1.36% $Sb_2O_3$ | 0.90% $Sb_2O_3$ | 0.00% $Sb_2O_3$ |
|---|---|---|---|---|
| COI (% $O_2$) Cone | 31.1 | 31.1 | 30.2 | 27.1 |
| Time to ignition (s) | 47 | 38 | 33.5 | 31.5 |
| Peak rate of heat release (kW/m$^2$) | 161.5 | 170 | 175.5 | 185.5 |
| Total heat released (MJ/m$^2$) | 61.95 | 59.45 | 58 | 63.9 |
| Total smoke released (-) | 3,237.65 | 3,046.15 | 2,923.2 | 2.698.15 |

What is claimed is:

1. A formulation comprising at least one polymer and at least one additive, halogen being present in the polymer and/or the additive, wherein there is present from 2 to 10 parts by weight, per hundred parts by weight of the polymer, of a mixture of 90–10 wt % of an antimony compound and 10–90 wt % of a divalent metal stannate or hydroxystannate, provided that the formulation contains not more than 1.5 wt % of the antimony compound, wherein at least 20 parts by weight, per hundred parts by weight of the polymer, of aluminum trihydroxide is present.

2. A formulation as claimed in claim 1, wherein the least one polymer is polyvinyl chloride or polyamide.

3. A formulation as claimed in claim 1, wherein at least 5 parts by weight, per hundred parts by weight of the polymer, of a halogenated plasticiser is present.

4. A formulation as claimed in claim 1, wherein the formulation contains not more than 1 wt % of the antimony compound.

5. A formulation as claimed in claim 1, wherein the antimony compound is antimony trioxide.

6. A formulation as claimed in claim 1, wherein the divalent metal stannate or hydroxystannate is zinc stannate or hydroxystannate.

7. A formulation as claimed in claim 1, consisting essentially of PVC, from 20–100 parts by weight of at least one plasticiser including at least 10 parts by weight of a chlorinated plasticiser, from 30–120 parts by weight of aluminium trihydroxide, a stabiliser and 2–10 parts by weight of a mixture of 90–10 wt % of antimony trioxide and 10–90 wt % of zinc stannate or hydroxystannate, all parts by weight expressed as per 100 parts by weight of PVC.

* * * * *